United States Patent [19]

Rabouyt

[11] Patent Number: 5,058,825
[45] Date of Patent: Oct. 22, 1991

[54] STEERING AID FOR ROTOR AIRCRAFT

[76] Inventor: Denis Rabouyt, 90ter, rue Pierre Brossolette, 92140 Clamart, France

[21] Appl. No.: 520,993

[22] Filed: May 7, 1990

Related U.S. Application Data

[63] Continuation of Ser. No. 328,196, Feb. 9, 1989, abandoned.

[51] Int. Cl.⁵ .................. B64C 27/52; B64C 27/58; B64C 27/02
[52] U.S. Cl. ........................... 244/17.25; 244/8; 244/221; 244/234; 244/230; 267/34
[58] Field of Search ............... 244/8, 228, 178, 221, 244/230, 236, 17.25, 232, 234; 267/34

[56] References Cited

U.S. PATENT DOCUMENTS

| | | | |
|---|---|---|---|
| 2,106,783 | 2/1938 | Wilford | 244/221 |
| 2,642,143 | 6/1953 | Miller | 244/17.25 |
| 3,173,631 | 4/1965 | Hendrickson | 244/230 |
| 3,228,478 | 1/1966 | Edenborough | 244/230 |
| 3,727,940 | 4/1973 | Hug | 267/34 |

FOREIGN PATENT DOCUMENTS

| | | | |
|---|---|---|---|
| 759330 | 5/1967 | Canada | 244/17.25 |
| 3431583 | 3/1986 | Fed. Rep. of Germany | |
| 1375454 | 9/1964 | France | |
| 1081341 | 8/1967 | United Kingdom | 244/17.25 |
| 2152461 | 8/1985 | United Kingdom | 244/8 |

Primary Examiner—Michael J. Carone
Attorney, Agent, or Firm—William A. Drucker

[57] ABSTRACT

Aircraft supported by rotors have an elastic device (28) that helps to angularly place the body of the aircraft in relation to the rotation axis of the rotor (1). This device has adjusting means (39-40-27) which the pilot can use during flight. The invention is in particular applicable to autogyros.

8 Claims, 2 Drawing Sheets

STEERING AID FOR ROTOR AIRCRAFT

This application is a continuation of application Ser. No. 07/328,196, filed Feb. 9, 1989, now abandoned.

The present invention relates to rotor aircraft and particularly autogyros.

The autogyro, with its supporting rotor, mounted on a fixed or rotary shaft and self rotating under the effect of the relative wind and with a propulsive or tractive propeller presents, with respect to the helicopter whose rotor provides the double function of support and propulsion, the advantage of a much lower manufacturing cost.

To overcome the drawback of the autogyro in transmitting to the flight control, and so to the pilot, considerable forces due to the action of the relative wind on the rotor considering the large dimensions thereof and the loads which it supports during different movements of the autogyro, its accelerations and its decelerations, as well as variations in the direction and/or intensity of the relative wind, it has been proposed to mount the rotor shaft on a pitch shaft slightly offset rearwards with respect to the rotational axis of the rotor and disposed below the rotational plane thereof.

With this arrangement, not only has partial compensation been obtained for the pitching forces and reduction of the reactions at the level of the flight control, but also an effect of semi-automatic piloting during pitching. In fact, if for any reason the speed of the autogyro decreases, the aerodynamic drag at the level of the rotor decreases accordingly. Braked to a lesser degree rearwards by said drag, the rotor slants forwards and the autogyro then begins to descend and accelerates. But such acceleration will bring the autogyro back to its preceding speed and the aerodynamic drag, resuming its preceding value, pulls the rotor rearwards, which straightens it and slows down the speed of the autogyro.

Despite that, however, the pitching reaction which the pilot must counter with his flight control varies, for the same weight at constant altitude, with the speed or, for an equal speed, with the weight. This is why the offset of the pitch axis with respect to the rotational axis of the rotor and its distance from the rotational plane thereof are generally chosen for the cruising speed of the autogyro transporting a certain percentage of the maximum load.

Thus, the nose-down support torque is balanced with the nose-up drag torque and, at the cruising speed and at a load equivalent to the chosen percentage of the maximum load, the reaction is then zero on the flight control.

On the other hand, the force which the pilot must supply in order to fly the autogyro at a different speed will be all the greater the further this speed is removed from the cruising speed, since he will have to cope with a nose-up torque all the higher the faster he flies or a nose-down torque also all the higher the slower he flies Compensation springs have therefore been proposed in UK patent 2152461 A filed on Jan. 10, 1984 relieving the pilot by preventing the force which he must supply from becoming excessive in the case of a prolonged flight at high or low speed, these springs being possibly adjustable by fixing at several possible anchorage points. But this system not only requires intervention before each flight, but also, to the extent that it acts only in the "nose-up" direction or only in the "nose-down" direction does not cover all the conditions of the same flight such as planned. Nor, all the more so, as carried out concretely, the pilot being possibly brought to cope with circumstances not anticipated when drawing up the flight plan.

The object of the present invention is to overcome these drawbacks and for this provides a piloting aid device making it possible, in a rotor driven aircraft, to cancel out all the reactions, particularly those of pitching, at the level of the flight control, so as to make the control light and the piloting precise under all flight conditions, either at low or high speed, or on take-off or on landing, even vertically.

It has as object an aircraft with rotor articulated to the body of the aircraft, comprising an auxiliary resilient device for angularly positioning said body with respect to the axis of rotation of said rotor, characterized in that said resilient device is provided with adjustment means accessible in flight by the pilot.

With these adjustment means, the pilot may balance his aircraft as a function of the flight conditions even if they vary during the same flight.

According to another characteristic of the invention, the adjustment means comprise the mobility of at least one support point of the resilient device, which mobility makes it possible to modify the characteristics for adapting them to the flight conditions.

According to another characteristic of the invention, the resilient device is double acting, the two actions being axially opposed to each other so as to assist the pilot in his opposite maneuvers, nose-down or nose-up for pitching and right or left for rolling and even to arrive at a certain automatic piloting.

Other features and other advantages of the invention will be clear from the following description, with reference to the accompanying drawings showing several embodiments given by way of non limitative example of the present invention.

Figure 1:
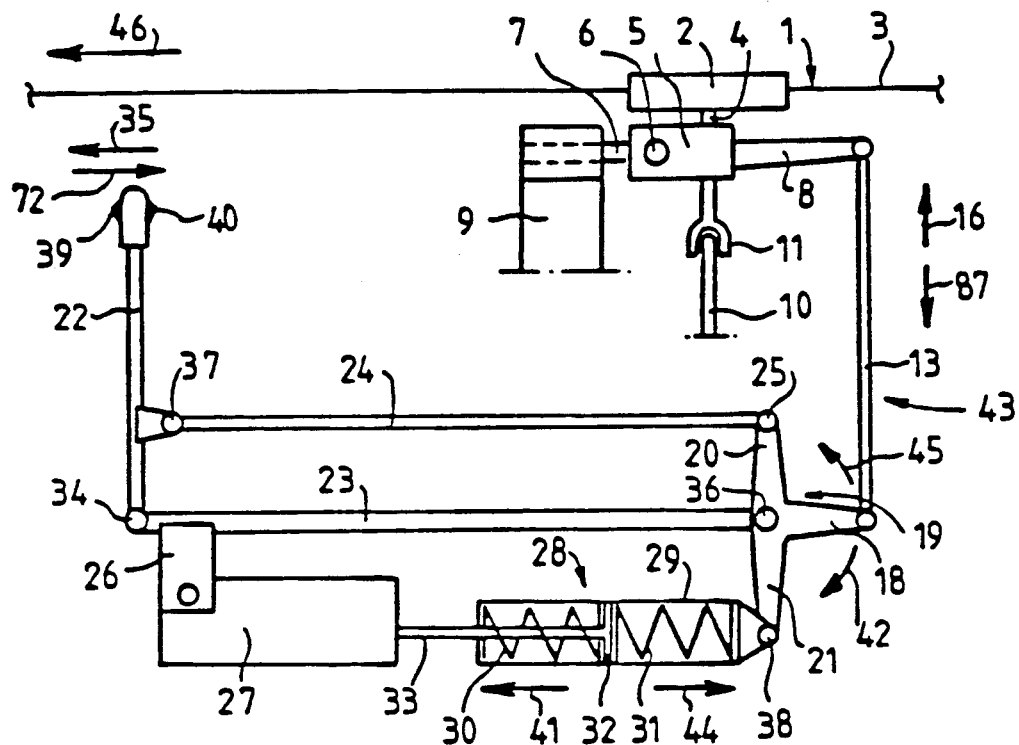
FIGS. 1 and 2 show an autogyro control with resilient device according to the invention, FIG. 2 being a right-hand view of FIG. 1.

The supporting rotor 1 comprising the hub 2 and blades 3 is mounted on a shaft 4 carried by a bearing 5. This bearing is articulated, on the one hand, to a shaft 6 and, on the other hand, to a shaft 7 perpendicular to the first one. Shaft 6 will be called pitch shaft in the present description and shaft 7, roll shaft.

The roll shaft is journalled in a bearing (not shown) incorporated in a mast 9 fixed to the body of the autogyro and disposed in front of bearing 5.

Shaft 4 of the rotor is driven in rotation, through a universal joint 11, by a shaft 10 shown partially because it does not form part of the invention.

Bearing 5 supports an arm 8 itself supporting a connecting rod assembly 43 in the form of a parallelogram whose upper bar 12, fixed to arm 8, is articulated to the ends of two rods 13 and 14, and whose lower bar 15 is articulated to the other end of the two rods.

Figure 2:
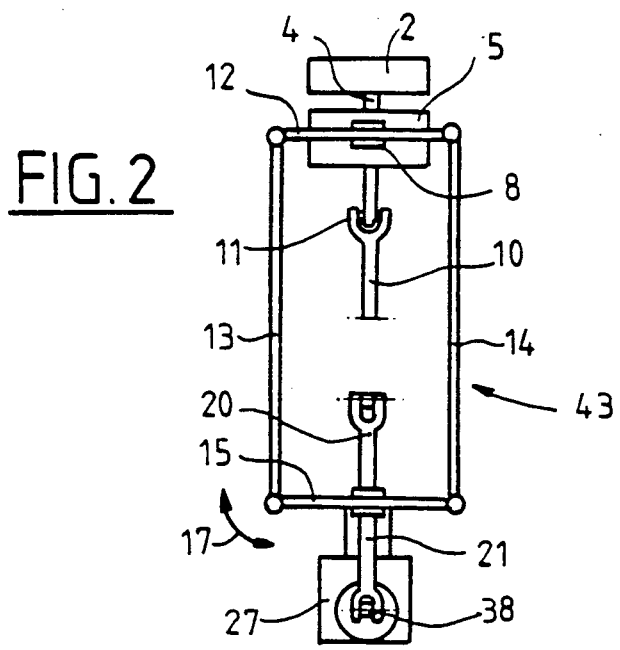

These four articulations make possible both movement of the assembly of the parallelogram, as shown by arrows 16 and 87 (FIG. 1) and deformation thereof as shown by arrow 17 (FIG. 2).

The lower bar 15 is integral with an arm 18 of a bellcrank lever 19 which comprises two others 20 and 21 and which is articulated at 36 as will be explained later.

Furthermore, the flight control comprises a manual rod 22 articulated at 34 to a tube 23 mounted for rotation in bearings not shown which are fixed to the body of the autogyro and prevent the axial translation of said tube 23.

A link 24 connects arm 20 of the bell-crank lever 19 to which it is articulated at 25, to lever 22 to which it is articulated at 37.

A resilient device 28 is articulated at 38 to arm 21. It is formed of a cylinder 29 which receives two identical springs 30 and 31. These two springs are at a zero point in the median position, i.e. they are not working in this position. They are fixed both to a piston 32 with a rod 33 which slides inside the cylinder and to the ends of cylinder 29.

On tube 23 is welded a support 26 to which an assembly 27 is articulated comprising a mechanical jack with fixed nut and threaded rod whose rotation is controlled by a double-acting electric motor. The threaded rod controls the axial movement of rod 33 and so the movement of piston 32 inside cylinder 29, either in one direction or in the other. The articulation of assembly 27 to support 26 does not allow translational movements thereof with respect thereto. It therefore remains fixed and, through the threaded rod and rod 33, it is then the piston 32 which forms the bearing point of springs 30 and 31, whatever the position of said piston inside the cylinder 29.

The handle of rod 22 has two electric contactors 39 and 40. Engagement of contactor 39 causes operation of the electric motor of assembly 27 and causes piston 32 to move towards said assembly (arrow 41) whereas engagement of contactor 40 starts up the electric motor of assembly 27 and causes the movement of piston 32 towards the articulation 38 (arrow 44).

Articulations 34 and 36 are such that a movement of lever 22 about 34 in the direction of arrows 35 or 72, i.e. during pitching, is transformed into a movement of the same angular value and in the same direction of the bell-crank lever 19 about 36. On the other hand, any movement of lever 22 about 34 in a plane perpendicular to arrow 35 causes rotation of assembly 23-24-19-28-26 and 27 about the axis of rotation of tube 23 and this movement causes, by the movement imparted to arm 18 and so to bar 15, deformation as shown by arrow 17 of the connecting rod assembly 43 in the form of a parallelogram.

Under these conditions, the operation is as described hereafter.

With the autogyro in cruising flight in the direction shown by arrow 46, with the rotor 1 substantially horizontal, bearing 5, connecting rod assembly 43, the bell-crank lever 19 and the flight control lever 22 are in the positions illustrated in FIGS. 1 and 2.

If the pilot wishes to nose-up his aircraft, he pulls the flight control rod 22 rearwards in the direction of arrow 72. This movement is transmitted, through link 24, to the bell-crank lever 19 which rotates about its axis 36, in the direction of arrow 42 and causes the connecting rod assembly 43 to move down. By its upper bar 12, this latter 43 pulls rearwards the assembly formed by arm 8, bearing 5, shaft 4 and rotor 1; the latter pivots about axis 6 and takes up a nose-up position.

This operation is that of a conventional autogyro. But it differs therefrom in that the pilot, at the same time that he pulls his flight control rod 22 rearwards has tripped the contactor 39 acting on the jack of assembly 27. The latter has at that time moved rod 33 axially in the direction of arrow 41 compressing spring 30 and stretching spring 31. Thus, the two springs tend to drive the cylinder 29 in the same direction (arrow 41), spring 30 acting under compression and spring 31 under traction: the bell-crank lever 19 tends to rotate in the direction of arrow 42, to cause the connecting rod assembly 43 to move down and to place the aircraft in the nose-up position.

The pilot therefore has no need to provide an appreciable force for pulling the flight control rod 22 back since springs 30 and 31 controlled by the jack of assembly 27 have considerably aided him to make this movement.

The phenomena will be reversed if the pilot wishes to put his autogyro nose-down. He trips contactor 40 at the same time as he pushes the flight control rod 22 forwards (arrow 35).

In this case, his action on rod 22 is transmitted through link 24 to the bell-crank lever 19 which is thus driven in the direction of arrow 45. But simultaneously, jack 27 moves piston 32 in the direction of arrow 44 compressing spring 31 and stretching spring 30. This results in a movement of cylinder 29 in the same direction as piston 32 and rotation of the bell-crank lever 19 in the direction of arrow 45.

As in the preceding case, springs 30 and 31 controlled by jack 27 have considerably helped the pilot in his maneuver.

Control of the autogyro has thus been made much lighter and piloting may be more precise, even under flight conditions very much different from normal cruising conditions.

Control during rolling is provided conventionally by operating the flight control rod 22 from right to left or from left to right. This then causes tube 23 to rotate as well as everything that it carries, namely the assembly 26-27-29 and 19. In its rotation, arm 18 of the bell-crank lever 19 drives the transverse bar 15 of the connecting rod assembly 43 and, by rods 13 and 14, the transverse bar 12. In its turn, the latter will cause the whole of rotor 1 to pivot, through arm 8, about the roll shaft 7.

It should be noted that the resilient pitch assistance device, whatever the position of piston 32 in cylinder 29, in no way interferes with the roll control.

A second advantage of the device proposed by the invention for assisting the pilot in his piloting is that he may under certain conditions release the flight control rod 22.

With the autogyro in cruising flight under normal conditions, let us imagine that the pilot releases his control rod.

If the aerodynamic drag increases, this increase results in a tendency of the rotor to nose-up by slanting rearwards. The connecting rod assembly 43 tends to move down and cause the bell-crank lever 19 to swing (arrow 42) about its axis 36 and such swinging will be transmitted by link 24 to the flight control rod 22 then pulled rearwards in the direction of arrow 72.

The two springs 30 and 31, the first urged under traction and the second under compression, will oppose these movements and absorb the effects thereof. Thus, the reactions will be attenuated, even practically cancelled out if the springs are adjusted to the correct pressure.

Similarly, if the operating conditions of rotor 1 change in the direction of an increase in the nose-down torque, this increase will result in a tendency of the rotor to slant forwards and so to cause the connecting rod assembly 43 to rise, to cause the bell-crank lever 19 to rotate in the direction of arrow 45 and cause the flight control rod 22 to swing in the direction of arrow 35. But, as in the preceding case, springs 30 and 31 will oppose these movements and absorb the effects thereof, their action being moreover reversed since spring 30 is now urged under compression and spring 31 under traction.

A third advantage, resulting moreover from the second one, is the possibility and the ease of installing a semi automatic or even automatic control of the autogyro.

In fact, the aerodynamic drag which causes a nose-up effect depends directly on the speed of the autogyro. The control of assembly 27 may then be slaved to an anemometer so as to cause, when necessary, either a nose-down effect in the case of slowing down, or a nose-up effect in the opposite case.

Of course, without departing from the scope of the invention, details of construction or their arrangement may be modified so as to obtain the same result.

Figure 3:
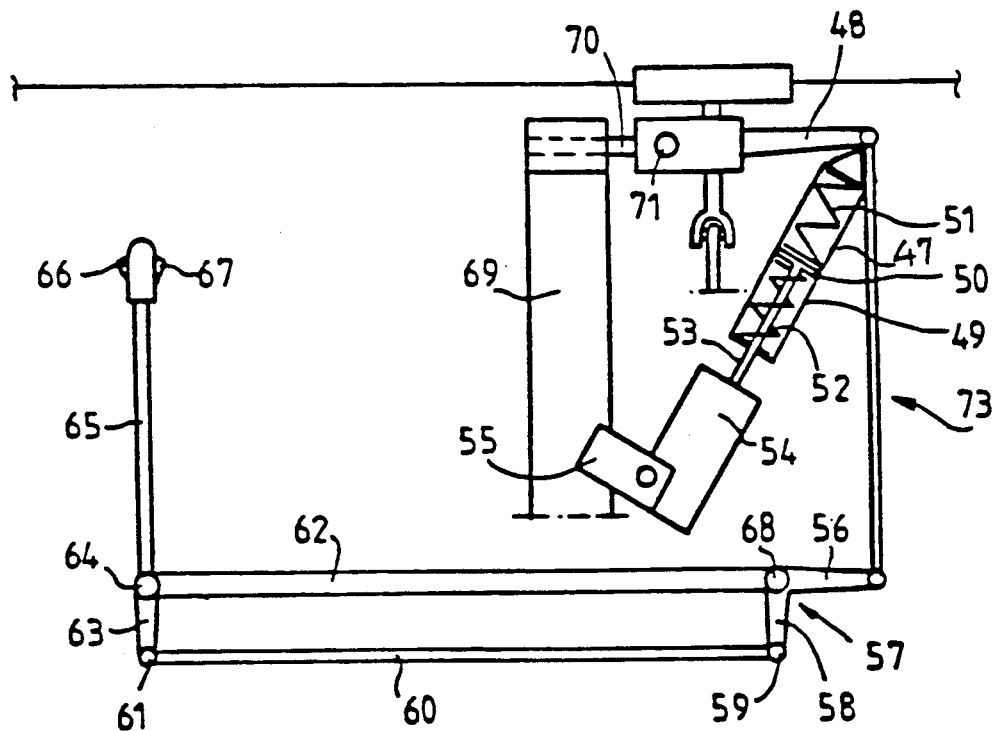
FIG. 3 shows a variant of FIG. 1.

Thus, FIG. 3 shows a variant of construction of the invention, in which the resilient device 47 of the invention is not associated, as in FIG. 1, with the roll tube forming part of the flight control, but is articulated directly to an arm 48 of the bearing of the rotor.

This resilient device, identical to the one shown in FIG. 1, comprises a cylinder 49 inside which a sliding piston 50 is fast with two identical springs 51 and 52 mounted in opposition on said piston. A rod 53 is connected to a threaded rod of a mechanical jack 54 articulated to a support 55 itself fixed to the mast 69 supporting the rotor, through a roll shaft 70 and a pitch shaft 71.

The flight control is simplified with respect to that of FIG. 1. It comprises a lever 65 with its two electric contactors, one 66 for nose-up and the other 67 for nose-down, a rotary tube called roll tube 62 having at its ends two articulations 68 and 64 to which are respectively articulated a bell-crank lever 57 and the flight control rod 65. Furthermore, the latter is continued beyond articulation 64 by an arm 63 to which, at 61, a link 60 is articulated which is articulated at its other end at 59 to the arm 58 of the bell-crank lever 57. Finally, the latter has a second arm 56 articulated to a connecting rod assembly 73 in the form of a parallelogram similar to connecting rod assembly 43 of FIGS. 1 and 2.

The operation of this assembly is similar to that illustrated in FIG. 1, any movement of piston 50 in cylinder 49 causing either a nose-up or nose-down reaction on the rotor as in the case of FIG. 1.

The advantage of this arrangement is the reduction of stresses in the transmission members of the flight control with respect to the arrangement shown in FIG. 1.

Figure 4:
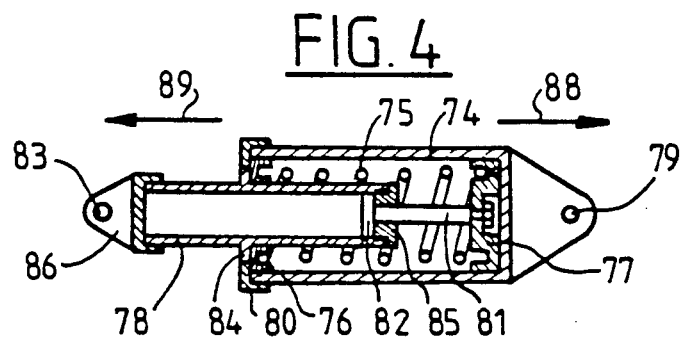
FIGS. 4, 5 and 6 show three positions of another resilient device according to the invention.
Figure 5:
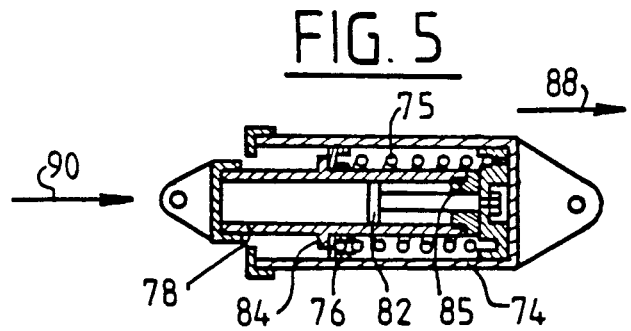
Figure 6:
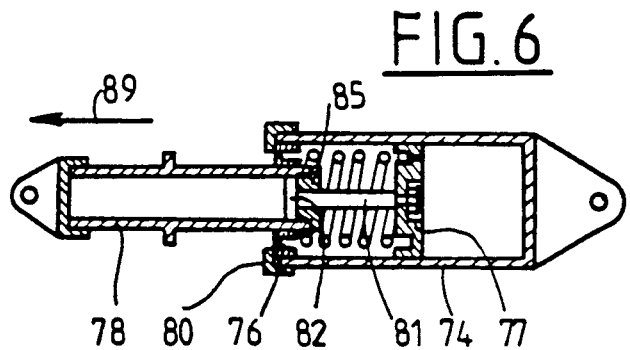

FIGS. 4, 5 and 6 also show another embodiment 90 of the invention in which a single spring is used.

This construction comprises a cylinder 74, a spring 75, two cups 76 and 77 and a shuttle slide 78.

Cylinder 74 has an articulation 79 for mounting it either like cylinder 29 of FIG. 1 or like cylinder 49 of FIG. 3. It is partially closed at the other end by a bearing ring 80.

Cups 76 and 77 are fitted with a sliding fit in cylinder 74 and thus form veritable pistons sliding sealingly. Similarly, cup 76 slides sealingly on the shuttle slide 78.

Finally, cups 76 and 77 each have a perforation placing their two faces in communication and whose purpose will be explained further on and cup 77 has a central rod 81 ending in a circular heel 82.

The shuttle slide 78 has a shoulder 84 and ends at one end in a perforated plug 85 through which the central rod 81 of cup 77 passes and, at the other end, in a cap 86 articulated at 83 to a jack rod not shown.

In FIG. 4, the device is at rest, spring 75 being compressed between cups 76 and 77. Cup 77 is in contact with the bottom of the cylinder whereas the heel 82 of its central rod 81 is in contact with plug 85 of the shuttle slide 78. Cup 76 is in contact both with the shoulder 84 of the shuttle slide 78 and with the bearing ring 80. The contact surface between heel 82 and plug 85 being placed at an equal distance from the bearing points of spring 75 on cups 76 and 77, the system is in equilibrium.

In FIG. 5, the shuttle slide 78 is urged towards the bottom of cylinder 74. In this movement, shoulder 84 has in its turn pushed the cup 76 back. Thus, there is no longer any contact between heel 82 and plug 85 and it is shoulder 84 which becomes the bearing point for spring 75. Under the compression which it undergoes, the latter will therefore push cylinder 74 back in the direction of arrow 88 and if the cylinder is mounted like cylinder 29 of FIG. 1, its movement will cause the bell-crank lever 19 to pivot, the connecting rod assembly 43 to move up and, through arm 8, place the rotor in nose-down position, whereas, if it is mounted as cylinder 49 in FIG. 3, it will cause arm 48 to rise directly, which also results in placing the rotor in a nose-down position.

In FIG. 6, the position of the spring is reversed.

The shuttle slide 78 has been pulled outwardly of cylinder 74 and, in this movement, plug 85, in contact with heel 82 of rod 81, has driven cup 77 in the direction of arrow 89. When cup 76 has arrived in contact with the bearing ring 80, it is cup 77 which forms the only bearing point for spring 75. The compression of this latter will push cylinder 74 back in the direction of arrow 89 and the result of this movement will be to place the rotor in the nose-up position, either through the connecting rod assembly 43 and arm 8 (FIGS. 1 and 2), or directly through arm 48 (FIG. 3).

The particular advantage of the resilient system 90 is, besides it being rare for a spring to break under compression, that possible breakage thereof would have no effect on safety.

A particular advantage should also be noted due to the construction of cups 76 and 77 as veritable pistons sliding sealingly in cylinder 74 : they thus form a true pneumatic damper for the aerodynamic vibrations due to the rotor and, in the absence of perforations of the cups, the resilient assembly 90 would transmit none of these vibrations, but the result would then be too great a force to be supplied by the pilot during movement of his flight control rod. The purpose of the perforations is precisely to make movement of the cups possible and so adjustment of spring 75 without too great an effort to be made by the pilot, while keeping for the cups, because of the pressure losses which they constitute, the piston and pneumatic damping effect.

It would moreover be possible to cause springs 30 and 31 (FIG. 1) to work only under compression. For that, it would be sufficient not to fix them to piston 32. But they would then have to be calculated accordingly.

Although the example of application chosen concerns autogyros with a rotor whose axis of rotation is offset with respect to the pitch axis, the present invention applies also perfectly to autogyros whose axis of rotation of the rotor intersects the pitch axis. It should be further noted that in autogyros the improvement brought to the control by the present invention is all the greater if they do not benefit precisely from the damping of the pitch reactions which offsetting of the axis of the rotation of the rotor with respect to its pitch axis obtains.

In the examples chosen, the autogyro has not been equipped with a resilient device for assisting roll control because the reactions thereof are generally minimal with respect to pitching. But it is evident that such a device could be installed on the same bases as the examples described. We have in fact seen that the pitch control assistance device had no influence on the roll control. The latter may then be equipped with a similar device having no effect on the pitch control.

In the examples given, the arm for operating the bearing carrying the shaft of the rotor is situated at the rear. Of course it could be installed either between the fixed mast and the bearing, or at the front of the mast. It is then sufficient to take into account the change of the lever arms and of the kinematics for obtaining the same results.

In so far as the mechanical springs are concerned, it would also be possible to replace them by oleopneumatic devices providing adjustable pressure and tension.

The mechanical jack of the electrically controlled assembly 27 could also be a hydraulic or an electromagnetic jack, for example with a mobile core in a solenoid.

I claim:

1. An autogyro, comprising a body, a rotor head mounted for pivoting about a pitch axis and a rolling axis, an articulated parallelogram linkage having first and second rods having upper and lower ends, a rigid lower bar articulated at the lower ends of said rods, linking means connecting the upper ends to said rotor head, a pilot control column, a rolling member having an axis, said rolling member being fixedly mounted in translation along said axis, with respect to said body and rotatably mounted about said axis, said rolling member being articulated at one end thereof on said column and at the opposite end thereof on a bell crank lever in turn rigidly connected to said lower bar, a link articulated at one end to said column and at the opposite end to said bell crank lever, a cylinder mounted for translation in both directions with respect to said body; means hingedly connecting one end of said cylinder to said articulated parallelogram linkage; a sliding member slidably mounted within said cylinder; spring means actuated by said sliding member; motor means coupled to said sliding member for translating said sliding member in any of said directions, from a reference position, and manual control means for controlling operation of said motor means during the flight.

2. The autogyro as claimed n claim 1, wherein said cylinder is articulated at one end to said bell crank lever and said motor means is rigidly connected to said rolling member.

3. An autogyro as claimed in claim 1, wherein said cylinder is articulated at said linkage means and said motor means is rigidly connected to said body.

4. An autogyro as claimed in claim 1, wherein said spring means essentially consist of a spring compressed between two cups slidably and sealingly mounted inside said cylinder.

5. An autogyro as claimed in claim 4, wherein each of said cups has a perforation placing its two faces in communication with each other.

6. An autogyro as claimed in claim 4, wherein said sliding member comprises two stops which limit the sliding of said cups.

7. An autogyro as claimed in claim 1, wherein said spring means comprises two springs mounted in opposition on the respective sides of a flat bearing surface movable within the cylinder.

8. An autogyro as claimed in claim 7, wherein said sliding member is piston having a head which forms said bearing surface, the two springs being fast to the respective sides of said head.

* * * * *